UNITED STATES PATENT OFFICE.

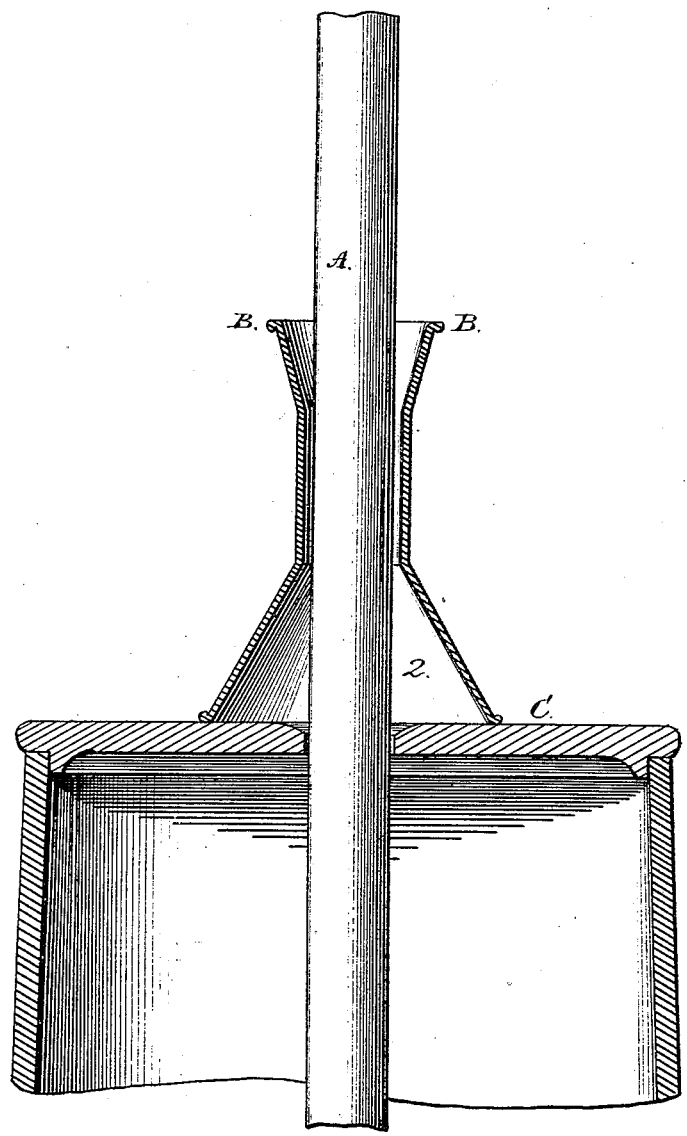

WESLEY MANEE, OF JEFFERSON TOWNSHIP, HILLSDALE COUNTY, MICH.

IMPROVEMENT IN CHURN-CAPS.

Specification forming part of Letters Patent No. 167,264, dated August 31, 1875; application filed March 11, 1875.

*To all whom it may concern:*

Be it known that I, WESLEY MANEE, of the township of Jefferson, in the county of Hillsdale and State of Michigan, have invented a new and useful Improvement, viz: a Churn-Cap, which is fully set forth in the following specification, reference being had to the accompanying drawings.

Figure 1 represents a churn. Fig. 2 is the bottom of churn-cap, which is larger than the top of the same.

A A represent the handle of churn-dash. B $b$ is top of churn-cap. C is the churn-cover.

When the handle A $a$ is worked up and down in churn it sometimes raises the cream in cap 2 about half-way, and no farther, as the bottom of the cap is made larger, preventing the cream from rising more than two inches from base, and prevents slopping over in churns, which is generally the case.

I claim as my invention—

The churn-cap, substantially as described above.

WESLEY MANEE.

Witnesses:
EUGENE ROWLSON,
WM. R. MONTGOMERY.